April 30, 1963  F. G. F. BEHLES  3,087,743
APPARATUS FOR AUTOMATICALLY CONTROLLING THE
ELEVATION ADJUSTMENT OF CAR BODIES
Filed March 8, 1960

INVENTOR
FRANZ G. F. BEHLES
BY Dickey, Craig + Freudenberg
ATTORNEYS

United States Patent Office 3,087,743
Patented Apr. 30, 1963

3,087,743
AN APPARATUS FOR AUTOMATICALLY CONTROLLING THE ELEVATION ADJUSTMENT OF CAR BODIES
Franz G. F. Behles, Stuttgart-Schonberg, Germany, assignor to Daimler-Benz Aktiengesellschaft, Stuttgart-Unterturkheim, Germany
Filed Mar. 8, 1960, Ser. No. 13,462
Claims priority, application Germany Mar. 11, 1959
12 Claims. (Cl. 280—124)

The present invention relates to an apparatus for automatically controlling the elevation adjustment of the body of a motor vehicle and particularly of a passager car, in which the car body is supported relative to the wheel axles by separate hydro-pneumatic suspension units which are associated with each wheel, and in which a control element on each axle which is associated with the suspension units of that axle is adapted to control the flow of an oil circuit from an oil tank through a pump to the suspension units, and also to control the return flow of oil from these units.

It is the principal object of the invention to provide an apparatus in which, for filling the hydro-pneumatic suspension units on one wheel axle, a control element on that axle will block the circuit of the oil which is continuously maintained during the operation of the car, and permit the oil to flow through a check valve directly into the suspension units against the pressure thereof, while for emptying the oil from the suspension units, a connection is automatically formed between these units and the same oil circuit which is used for filling them.

The known apparatus for automatically controlling the elevation adjustment of a car body which is supported relative to the wheel axles by hydro-pneumatic suspension units, require a high-pressure pump for conveying the oil to a high-pressure tank which is provided with a special pressure-regulating device and from which oil conduits lead to separate elevation control valves which are associated with each wheel axle. For filling the suspension units, the elevation control valves direct oil under pressure into these units, while for emptying the units they permit the oil to escape therefrom which then flows back to the oil tank through special oil-return conduits. Still further conduits are also required to return any oil leaking from the suspension units and the elevation control valves to the oil tank.

The apparatus according to the present invention, as previously outlined, has the great advantage over this known control system of being designed and constructed much more easily and inexpensively. It does not require any high-pressure tank with a special pressure-regulating device, and the oil pump also does not need to be a high-pressure pump but only one to supply a medium pressure since it has to convey the oil against the pressure contained in the suspension units and does not have to overcome the pressure in a high-pressure tank which is usually twice as strong as the pressure in the suspension units. Furthermore, the apparatus according to the invention does not require any oil return lines nor any leak-oil lines.

A further object of the invention is to provide the control elements in the form of control valves which are adapted to control the oil circuit as well as the elevation of the car body above the wheel axles, and each of which is provided with a main inlet passage for the oil circuit which is controlled by a valve, a discharge passage which is likewise controlled by a valve and connects the suspension units with the main inlet passage, and a secondary inlet passage which branches from the main inlet passage in front of its valve and is provided with a spring-loaded check valve. By such a design it is possible to produce a control valve which combines the function of a pressure-regulating valve and the function of an elevation-adjusting valve and may be of a very simple and inexpensive structure. This structure and the operation of the control valve may according to the invention be still further simplified by providing each valve with a single piston for controlling the main inlet passage as well as the discharge passage.

Another feature of the invention consists in providing the control valve which is disposed in the oil circuit directly behind the oil pump, that is, preferably the control valve for the suspension units of the rear axle, at a point between the main inlet passage and the discharge passage behind the control piston with a spring-loaded check valve which is adapted to open in the inlet or discharge direction of the oil flow. The spring of the check valve in the branch inlet passage of the same control valve is also preferably made of a greater strength than the spring of the corresponding check valve of the other control valve.

The discharge passage of each of the two control valves may be made of a restricted cross section to throttle the oil flow or, instead, according to another feature of the invention, the inlet opening of the discharge passage may be disposed within the wall surface of a cylindrical bore, and a cylindrical pin which is adapted to be shifted in a direction transverse to its axis may be disposed in front of this inlet opening and be made of a diameter greater than the diameter of this inlet opening of the discharge passage. Since the flow of oil will press the cylindrical pin against the inlet opening of the discharge passage, the flow of discharged oil will be considerably throttled or entirely blocked. This design has the advantage that impurities contained in the oil cannot clog the discharge passage as it would easily occur if the discharge passage had a very small cross-sectional size.

The cylindrical pin may be disposed between the check valve in the branch inlet passage and the spring acting upon the valve member of that valve which preferably consists of a ball. An extension of this pin may also serve as a support of the spring, and the cylindrical pin itself may be pressed by this spring against the ball of the valve. Furthermore, the pin or its extension may be designed so as to limit the opening movement of the ball and thus the flow of oil passing through the check valve.

These as well as other objects, features, and advantages of the present invention will become further apparent from the following detailed description thereof, particusarly if the same is read with reference to the accompanying drawings, in which—

FIGURE 2 shows a longitudinal section of the control valve for the rear axle of the car;

FIGURE 3 shows a longitudinal section of the control valve for the front axle of the car; while FIGURE 4 shows a cross section taken along line IV—IV of FIGURE 2.

Figure 1:
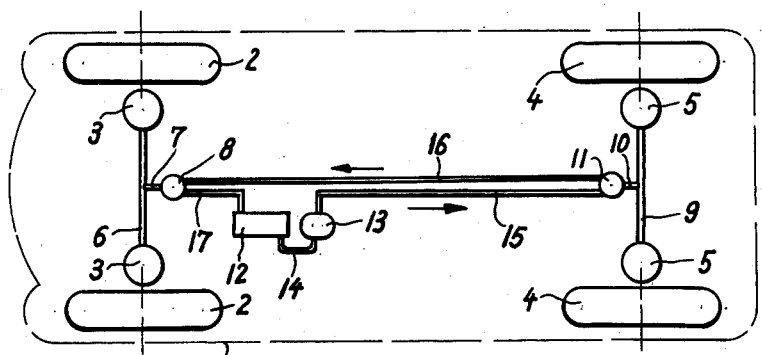
FIGURE 1 shows a diagrammatic bottom view of an automobile which is provided with hydro-pneumatic suspension units for supporting the car body, and it also shows the general arrangement of the control valves according to the invention with respect to the car body.
Figure 1A:
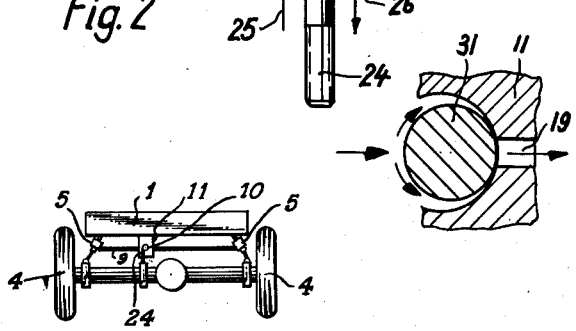
FIGURE 1A is a diagrammatic rear view of the automobile showing the connection of the control element with the vehicle axle.

Referring to the drawings, FIGURES 1 and 1A diagrammatically illustrate an automobile 1 with front wheels 2 and rear wheels 4. The front axle is operatively connected to separate hydro pneumatic suspension units 3 for each front wheel, and the rear to similar suspension units 5 for the rear wheels. The suspension units 3 on the front axle are connected to each other by an oil conduit 6 and to a control valve 8 by another oil conduit 7 branching from conduit 6, while the suspension units 5 on the rear axle are likewise connected to each other by an oil conduit 9 and to a control valve 11 by an oil conduit 10 branching from conduit 9. Both control valves 8 and 11 are connected in series in an oil circuit which leads from an oil tank 12 through a conduit 14 to a pump 13, and from the latter through a conduit 15 to control valve 11, and further from control valve 11 through oil conduit 16 to control valve 8 and thence through conduit 17 back to oil tank 12.

Figures 2, 3, 4:
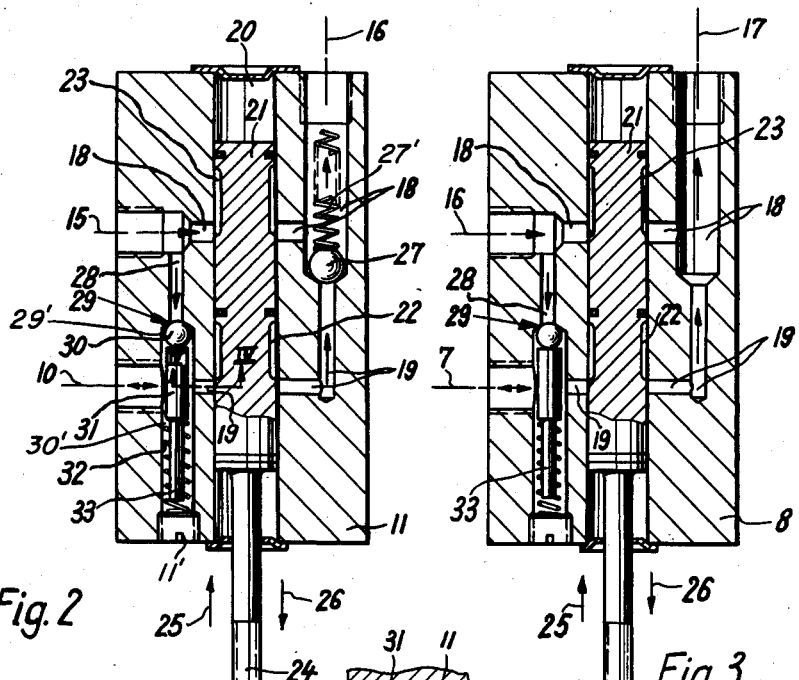

As illustrated in detail in FIGURE 2, control valve 11 for the suspension units 5 which are associated with the rear axle is provided with a main inlet passage 18 and a discharge passage 19. Both passages 18 and 19 partly extend parallel to each other and both of them are controlled by a piston 21 which for this purpose is provided with annular grooves 22 and 23 and is slidable along a bore 20 which crosses passages 18 and 19. The piston rod 24 of piston 21 is connected in a suitable manner to the rear axle of the car, see FIGURE 1A, so that the piston will follow the reciprocating movements of the rear axle in the direction away from the car body or in the direction toward the same and thus move along bore 20 of control valve 11, which is secured to the car body, either in the direction of arrow 25 to fill the suspension units or in the direction of arrow 26 of empty the suspension units. In front of piston 21, as seen in the direction of flow, inlet passage 18 is connected to oil conduit 15 coming from pump 13, as shown in FIGURE 1, while behind piston 21 passage 18 is connected to oil conduit 16 which leads to control valve 8 on the front axle of the car. Behind piston 21, discharge passage 19 terminates into inlet passage 18 and is separated therefrom by a check valve 27 which is normally held in the closed position by a spring 27'. In front of piston 21, the two passages 18 and 19 are connected by a branch inlet passage 28 and a chamber 30'. The inlet passage 28 is normally closed in the direction toward passage 18 by a check valve 29 which consists of a ball 30 seating against face 29' and a cylindrical pin 31 which is pressed against the valve seat by a spring 32. The spring is mounted on an extension 33 of pin 31 and acts against a stationary part 11'. The free end of extension 33 is spaced from part 11' a predetermined distance, which distance limits the extent of the opening movement of ball 30. Behind check valve 29, the chamber 30' is connected to discharge passage 19 and oil conduit 10 from which oil conduit 9 then leads to the suspension units 5 on the rear axle, as shown in FIGURE 1.

FIGURE 3 illustrates the control valve 8 for the suspension units on the front axle of the car, which is substantially similar to control valve 11 for the rear suspension units 5, as shown in FIGURE 2, and the individual corresponding parts of which are therefore identified by the same numerals. The difference between the two valves 8 and 11 merely consists in the fact that control valve 8 is not provided with a check valve at the opening of discharge passage 19 into the main inlet passage 18. In front of piston 21, inlet passage 18 is connected to oil conduit 16 coming from control valve 11, while behind piston 21 inlet passage 18 merges into oil conduit 17 which leads to oil tank 12, as shown in FIGURE 1.

FIGURES 2 and 3 illustrate the two control valves 8 and 11 in a position which corresponds to the normal vertical position of the car body above the wheel axles. Discharge passage 19 are then closed by pistons 21, while inlet passages 18 are opened by pistons 21. Since oil pump 13 is driven continuously during the operation of the car, for example, by an electric motor which may be started by a door switch, or mechanically by the engine of the car, pump 13 will draw oil continuously from oil tank 12 through oil conduit 14 and convey the same in a circuit through conduit 15, the main inlet passage 18 in control valve 11, conduit 16, the main inlet passage 18 in control valve 8, and then back to oil tank 12 through conduit 17.

If control valve 8 or 11 is operated by the movement of the respective axle toward the car body to fill the suspension units 3 or 5, respectively, the respective piston 21 will move in the direction of arrow 25 into bore 20, whereby the annular groove 23 on piston 21 which previously allowed the oil to flow through the main inlet passage 18 will be shifted so that piston 21 will block that passage. The oil conveyed by pump 13 will therefore flow through the branch inlet passage 28 and, due to its pressure, will open check valve 29 and pass through oil conduits 7 or 10 and 6 or 9, respectively, to suspension units 3 or 5. The suspension units will thereby expand and restore the original distance between the wheel axles and the car body which is determined by the position of piston 21 in control valve 8 or 11, respectively, as illustrated in FIGURES 2 and 3.

If control valve 8 or 11 is operated by a movement of the respective wheel axle away from the car body so as to empty the suspension units 3 or 5, piston 21 will move from the position illustrated in FIGURE 2 or 3 in the direction of arrow 26. The annular groove 23 of piston 21 will then maintain the inlet passage 18 in the open position so that the oil circuit from pump 13 will not be interrupted. However, the lower annular groove 22 on piston 21 will open the discharge passage 19 so that the oil can flow from suspension units 3 through oil conduits 6 and 7 or from suspension units 5 through oil conduits 9 and 10 and then through discharge pasage 19 of the respective control valve to piston 21 and around the latter to passage 18 and thus into the oil circuit. The oil coming from the suspension units must then have a pressure sufficient to overcome the pressure of the spring of check valve 27 so as to open that valve.

When the oil is discharged from the suspension units 3 or 5, the cylindrical pin 31 of check valve 29 will be shifted transversely to its axis, as shown in FIGURE 4, and be forced against the mouth of discharge passage 19. Since the diameter of pin 31 is greater than the diameter of passage 19, the flow of oil into the latter will be throttled. If the flow is completely interrupted, the cylindrical pin will, due to the action of its spring 32, assume a vertical position. As compared with a discharge passage of a very small cross-sectional size, this design will prevent the discharge passage 19 and especially the mouth thereof from being clogged by impurities or the like contained in the oil.

If the control valves on both wheel axles are operated so as to fill the suspension units, the oil circuit will be interrupted by piston 21 shutting off the main inlet passage 18 in control valve 11. The suspension units 5 on the rear axle will then first be filled up and thereafter, when piston 21 has again returned to its original position, suspension units 3 on the front axle will also be filled by the flow of oil passing through conduit 16 and passage 18 of control valve 8. Thus, the controlling action of the valves will in the first instance be directed toward the suspension units on the rear axle since in automobiles that axle is primarily affected by variations in the load.

In order to operate the control valves so that control valve 11 on the rear axle will empty the suspension units 5, while control valve 8 on the front axle will fill suspension units 3, it is only necessary to provide the check valve 27 in control valve 11 which will then prevent the oil from flowing from the main inlet passage 18 past piston 21 into the discharge passage 19.

Control valve 11 on the rear axle is preferably provided with a stronger compression spring 32 of check valve 29 than the control valve 8 on the front axle so that, when control valve 8 is operated by the front axle, it will fill the suspension units 3 even though control valve 11 on the rear axle remains in the position as illustrated.

Although the invention has been illustrated and described with reference to the preferred embodiment thereof, it may be understood that it is in no way limited to the details of such embodiment, but is capable of numerous modifications within the scope of the appended claims.

What is claimed is:

1. A system for an automobile having a body and front and rear axle means each having a pair of wheels thereon, comprising separate hydro-pneumatic suspension units associated with each of said wheels for supporting said body relative to said axle means, and a control element operatively associated with each said axle means and with the suspension units of said axle means, and oil supply means for said suspension units comprising an oil container, an oil pump adapted to operate continuously during operation of the automobile, a plurality of oil conduits, said conduits connecting said container, said pump, and said control elements in series so as to form an oil circuit in which oil flows from said pump to one of said control elements to the other of said control elements to said container and back to said pump, a conduit means for operatively connecting a respective control element with the suspension units of a respective axle means, each of said control elements being adapted to control the flow of oil through said circuit and including a check valve, means for selectively blocking said oil circuit, said blocking means selectively passing the oil through said check valve directly to a respective one of said conduit means and the suspension units of a respective axle means against the pressure thereof so as to permit the suspension units on said respective axle means to be filled and forming a connection between said oil circuit and said respective conduit means and the suspension units of said respective axle means for discharging the oil from said suspension units into said circuit, and actuating means responsive to the distance between said body and said respective axle means for controlling said blocking means, whereby each control element is adapted to control the flow of oil to the suspension units on one of said axle means and the discharge of oil therefrom in accordance with the distance between said body and said one axle means at any particular time during the operation of said vehicle.

2. A system as defined in claim 1, in which each of said control elements comprises a control valve for controlling said oil circuit as well as the elevation of the car body above the wheel axle means, said control valve having a main passage for said oil circuit, a discharge passage connecting the conduit means operatively connected to the suspension units associated with the control element with said main passage, and a passage branching from said main passage and leading to said suspension units, said check valve being a spring-loaded check valve arranged within said branch passage and wherein said blocking means comprising first valve means for controlling said main passage and second valve means for controlling said discharge passage, said passage branching from said main passage branching therefrom in front of said first valve means.

3. A system as defined in claim 2, in which said check valve in said branch passage of the control valve disposed in said circuit directly behind said oil pump has a stronger closing spring than the corresponding check valve of the other control valve.

4. A system as defined in claim 2, in which said discharge passage has a smaller cross-sectional size than said main passage to throttle the flow of oil therethrough.

5. A system as defined in claim 2, in which said first and second valve means of each control valve for controlling said main passage and said discharge passage, respectively, together consist of a single piston.

6. A system as defined in claim 5, in which the control valve which is disposed in said oil circuit directly behind said oil pump further includes a spring-loaded check valve disposed behind said piston between said main passage and said discharge passage and adapted to open in the direction of the oil flow through said discharge passage toward said main passage.

7. A system as defined in claim 6, in which said control valve disposed in said oil circuit directly behind said oil pump is associated with the suspension units of the rear axle, while the other control valve is associated with the suspension units of the front axle.

8. A system as defined in claim 2, in which each control valve further includes a chamber disposed in front of the mouth of said discharge passage, and a substantially cylindrical member movably arranged within said chamber, said cylindrical member being movable in said chamber under the pressure of the discharged oil in a direction transverse to its axis toward the mouth of said discharge passage and having a diameter greater than the diameter of said mouth so as to throttle the flow of oil into said discharge passage.

9. A system as defined in claim 8, in which said chamber and said cylindrical member therein are disposed between said check valve in said branch passage and the spring acting upon the valve member of said check valve.

10. A system as defined in claim 8, in which said check valve in said branch passage comprises a valve seat and a ball, said cylindrical member engaging at one end with said ball and having an extension at the other end coaxially therewith, and a spring on said extension and acting against said cylindrical member to press the same against said ball.

11. A system as defined in claim 10, in which the free end of said extension is spaced at a certain distance from a stationary part of said control valve when said ball of said check valve is pressed upon its seat, said distance determining the extent to which said check valve may open against the action of said spring.

12. A control system for use in an automobile having a body and front and rear axle means each having a pair of wheels thereon, comprising separate hydro-pneumatic suspension units associated with each of said wheels for supporting said body relative to said axle means, and a control element operatively associated with each axle means, conduit means operatively connecting each control element with the suspension units of a respective axle means, pressure oil supply means operating continuously during operation of the automobile, second conduit means interconnecting said pressure oil supply means and said control elements in series to form an oil circuit wherein the oil flows from said pressure oil supply means continuously during operation thereof to one of said control elements and then to the other of said control elements and back to said pressure oil supply means, each of said control elements normally allowing unimpaired flow of oil through said circuit and including means for selectively blocking the flow of oil through said circuit and for selectively passing the oil to the suspension units on a respective one of said axle means and the discharge of oil from said last-mentioned suspension units, and means for controlling said means for selectively blocking the flow of oil in accordance with the distance between said body and said respective one of said axle means.

References Cited in the file of this patent

UNITED STATES PATENTS

| | | |
|---|---|---|
| 2,644,699 | Weiertz et al. | July 7, 1953 |
| 2,653,021 | Levy | Sept. 22, 1953 |
| 2,879,795 | Rossman | Mar. 31, 1959 |
| 2,957,702 | Heiss | Oct. 25, 1960 |